UNITED STATES PATENT OFFICE.

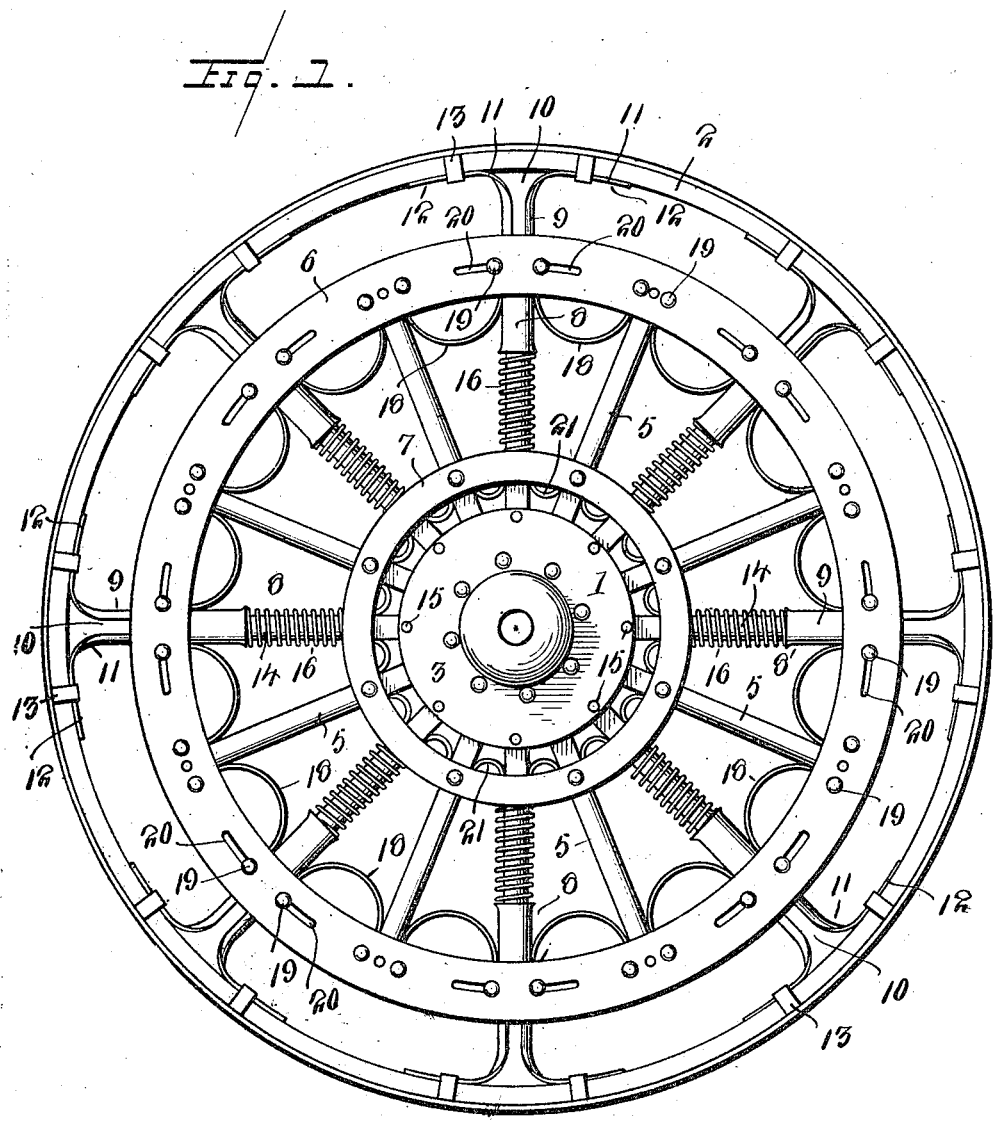

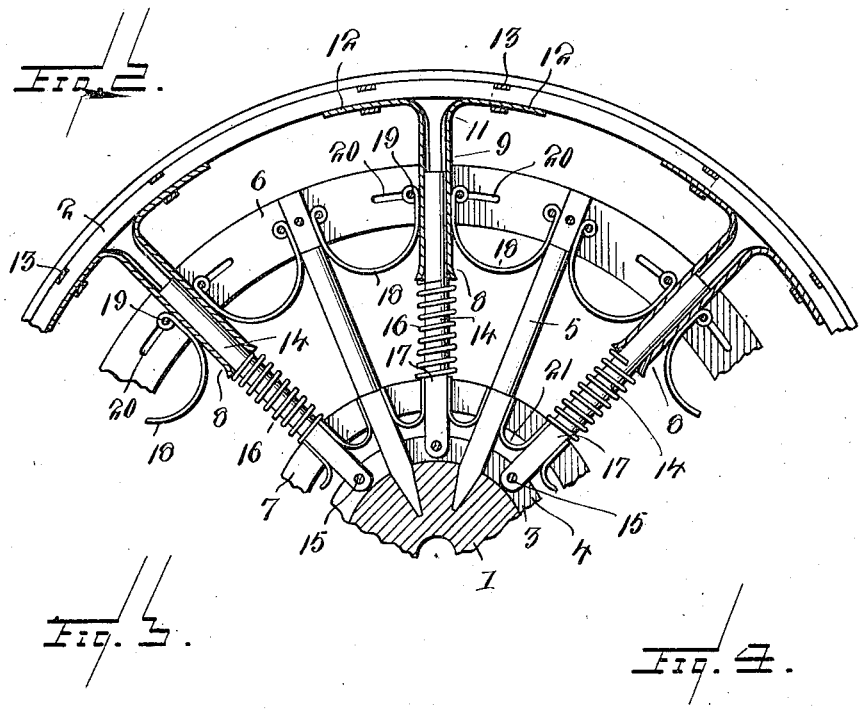
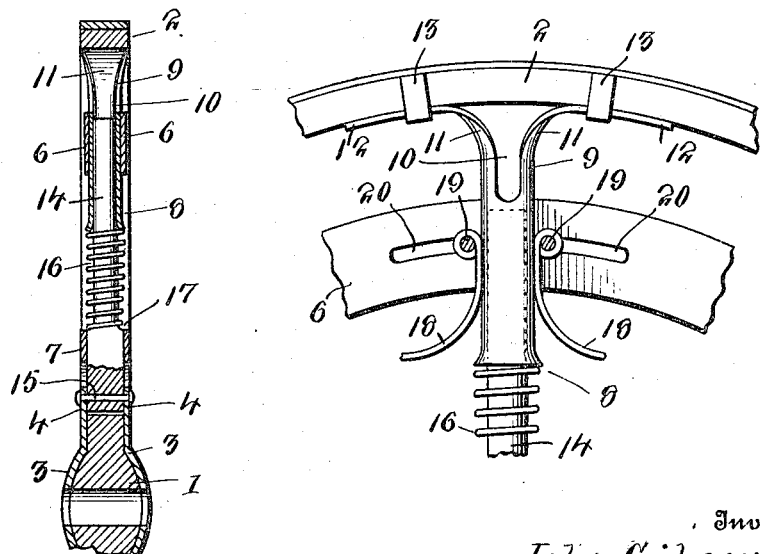

JOHN GIBSON, OF COURTENAY, NORTH DAKOTA.

SPRING VEHICLE-WHEEL.

1,064,636.

Specification of Letters Patent.   Patented June 10, 1913.

Application filed June 28, 1912. Serial No. 706,508.

*To all whom it may concern:*

Be it known that I, JOHN GIBSON, a citizen of the United States, residing at Courtenay, in the county of Stutsman and State of North Dakota, have invented new and useful Improvements in Spring Vehicle-Wheels, of which the following is a specification.

This invention relates to spring vehicle wheels, the object in view being to provide a wheel which will take the place of the usual pneumatically tired wheel, and absorb the vibrations, without any liability of transmitting the same to axles and body of the machine.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a spring wheel, embodying the present invention. Fig. 2 is a longitudinal section through a portion thereof. Fig. 3 is a cross section through half of the wheel. Fig. 4 is a detail view of one of the plungers and the parts immediately connected therewith.

The wheel contemplated in this invention comprises essentially a hub 1, and a felly 2, the same being connected together for relative movement, in a manner hereinafter described.

The hub is preferably provided with side plates 3 secured to the inner and outer faces thereof, and extended at their peripheries beyond the outer face of the hub, so as to form projecting circumferential flanges 4. Extending outward radially from the hub are the spokes 5, while arranged between the felly and the hub are two sets of annular bands, the outer set, designated at 6, being located fairly close to the felly, while the inner set, designated at 7, is located fairly close to the hub. All of the spokes are securely connected to the outer and inner sets of annular bands, so that all of said parts, together with the hub, move as a unit. It will be observed that the annular bands are secured to the opposite sides of the spokes, thereby leaving intervening spaces between the bands, in which and through which the plungers, hereinafter described, are adapted to slide in a radial direction, as well as to move in a circumferential direction to a limited extent.

Secured to the inner face of the felly and extending inward therefrom is a circular series of plungers 8. Each plunger comprises an outer tubular member 9, the outer end of which is preferably split, as shown at 10, to form two spring arms 11, the outer ends of which are bent in opposite directions, to form attaching portions 12 which are secured to the inner face of the felly in any convenient manner, the attaching device shown in the drawings consisting of a hoop or band 13, embracing all of the attaching portions of the plungers and embracing the felly. Each plunger further embodies an inner section 14 which is of a size adapting it to slide or telescope within the outer section, and said inner section has its inner extremity held between the circumferential flanges of the hub, as shown, and is pivotally connected with said flanges by means of a pin 15, thereby allowing a sufficient pivotal movement of each plunger, to admit of the yielding of the felly in both a radial or circumferential direction.

Disposed around the inner section of each plunger is a coiled spring 16, the inner end of which is seated against a shoulder 17 on the inner section of the plunger, while the outer end of the spring bears against the inner end of the outer tubular section of the plunger, so that the tension of said spring is always exerted to hold the outer section of the plunger outward with a yielding pressure. At this point, it will be noted that each plunger has an outward and inward sliding movement between the annular bands, and is also adapted to move in the direction of length or circumference of said bands.

In order to cushion the circumferential movement of the plungers, bowed cushioning springs 18 are interposed between the plungers and the spokes, the opposite ends of each spring being connected by pins 19 to the annular bands. At one end, the pin 19 is mounted to slide in curved slots 20 in the annular bands, and while the spring exerts a lateral pressure in a circumferential direction against the adjacent plunger and spoke, it is obvious that said spring will yield to allow the requisite circumferential movement of the plunger between the spokes. Similar but smaller cushioning springs 21 are interposed between the spokes and plungers adjacent to the hub, and preferably between the inner annular bands, the same serving as a further cushioning means for resisting the relative circumferential movements of the felly and hub.

From the foregoing description, it will be understood that the hub is supported by means of springs within the felly, to which the tire, either rubber or metal, may be secured in any convenient manner. The springs allow of the telescopic movement of the plungers, and also admit of a limited amount of circumferential movement between the felly and hub. As a result, all vibration and jar is absorbed by the wheel and prevented from being transmitted to the axle or body of the vehicle, in connection with which the wheel is used. The spring arms of the outer tubular section of each plunger also serve to absorb vibration, and furthermore to allow of the slight pivotal movement between the inner member of the plunger and the wheel hub.

What is claimed is:

1. A spring vehicle wheel, comprising a hub, a felly, annular bands of equal size intermediate the hub and felly and formed with circumferential slots, spokes connecting the hub and bands, plungers connected to the felly and extending inward between the annular bands and between the spokes, cushioning springs yieldingly sustaining said plungers, circumferentially acting cushioning springs interposed between the spokes and plungers and provided with eyes at their extremities, and pins inserted through said eyes and working in the slots in the annular bands.

2. A spring vehicle wheel, comprising a hub, a felly, annular bands of equal size intermediate the hub and felly, spokes connecting the hub and bands, plungers connected to the felly and extending inward between the annular bands and between the spokes, and cushioning springs yieldingly sustaining said plungers, the outer ends of the plungers embodying integral spring attaching portions which are slidingly connected with the felly.

3. A spring vehicle wheel, comprising a hub, a felly, annular bands of equal size intermediate the hub and felly, spokes connecting the hub and bands, plungers embodying outer tubular sections attached to the felly, inner sections slidable in the outer sections and having a jointed connection with the hub, and springs coiled around the inner spoke sections and serving to press the outer spoke sections in an outward direction.

In testimony whereof I affix my signature in presence of two witnesses.

JOHN GIBSON.

Witnesses:
 LORAN NICHOLS,
 H. S. STRANNESS.